US012744697B2

(12) United States Patent
Shi et al.

(10) Patent No.: US 12,744,697 B2
(45) Date of Patent: Sep. 22, 2026

(54) GUARD PERIOD DETERMINATION METHOD AND APPARATUS, TERMINAL AND STORAGE MEDIUM

(71) Applicant: VIVO MOBILE COMMUNICATION CO., LTD., Dongguan (CN)

(72) Inventors: Yuan Shi, Dongguan (CN); Rakesh Tamrakar, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 231 days.

(21) Appl. No.: 18/373,949

(22) Filed: Sep. 27, 2023

(65) Prior Publication Data

US 2024/0022460 A1 Jan. 18, 2024

Related U.S. Application Data

(63) Continuation of application No. PCT/CN2022/084774, filed on Apr. 1, 2022.

(30) Foreign Application Priority Data

Apr. 2, 2021 (CN) ......................... 202110363885.1

(51) Int. Cl.
*H04W 4/00* (2018.01)
*H04L 27/26* (2006.01)
*H04W 72/0446* (2023.01)

(52) U.S. Cl.
CPC ...... *H04L 27/2605* (2013.01); *H04L 27/2613* (2013.01); *H04W 72/0446* (2013.01)

(58) Field of Classification Search
None
See application file for complete search history.

(56) References Cited

U.S. PATENT DOCUMENTS 11,018,822 B2 * 5/2021 Choi ..................... H04L 5/0091
2019/0260533 A1 8/2019 Manolakos et al.
(Continued)

FOREIGN PATENT DOCUMENTS

CN 109802801 A 5/2019
CN 110535581 A 12/2019
(Continued)

OTHER PUBLICATIONS

Extended European Search Report issued in related European Application No. 22779129.0, mailed Aug. 30, 2024, 12 pages.
(Continued)

*Primary Examiner* — Bob A Phunkulh
(74) *Attorney, Agent, or Firm* — IPX PLLC

(57) ABSTRACT

The present application discloses a guard period determination method and apparatus, a terminal, and a storage medium. The guard period determination method includes: determining, by a terminal, a target guard period between two target sounding reference signal resources; and transmitting, by the terminal, two target sounding reference signals based on the target sounding reference signal resources and the target guard period. The two target sounding reference signal resources are any two sounding reference signal resources that are adjacent in the time domain within an antenna switching group; and one antenna switching group includes all sounding reference signal resources used to detect one piece of complete channel state information, and all sounding reference signal resources in the one antenna switching group are of the same resource type.

17 Claims, 2 Drawing Sheets

(56) References Cited

U.S. PATENT DOCUMENTS

| | | | | |
|---|---|---|---|---|
| 2022/0166587 | A1* | 5/2022 | Go | H04L 1/1864 |
| 2022/0201696 | A1* | 6/2022 | Go | H04W 72/51 |
| 2022/0224444 | A1* | 7/2022 | Go | H04L 5/0051 |
| 2023/0144253 | A1* | 5/2023 | Chen | H04W 72/1268 370/329 |
| 2023/0147639 | A1* | 5/2023 | Go | H04L 5/0023 455/101 |
| 2023/0337142 | A1* | 10/2023 | Go | H04L 5/0048 |
| 2023/0337229 | A1* | 10/2023 | Cui | H04B 7/0602 |
| 2024/0031097 | A1* | 1/2024 | Go | H04L 5/0051 |
| 2024/0214150 | A1* | 6/2024 | Xiao | H04L 5/0048 |

FOREIGN PATENT DOCUMENTS

| | | | |
|---|---|---|---|
| CN | 111201746 | A | 5/2020 |
| CN | 113300823 | A | 8/2021 |
| WO | 2019218108 | A1 | 11/2019 |

OTHER PUBLICATIONS

CMCC: "Enhancements on SRS flexibility, coverage and capacity", 3GPP Draft; R1-2101037, Jan. 2021, 8 pages.

Mediatek Inc: "Interruption at SRS antenna switching", 3GPP Draft; R4-1900682, Feb. 2019, 6 pages.

Second Office Action issued in related Chinese Application No. 202110363885.1, mailed Jul. 31, 2024, 3 pages.

International Search Report issued in corresponding International Application No. PCT/CN2022/084774, mailed Jun. 8, 2022, 6 pages.

OPPO, "Enable gNB to configure downgrading configuration of SRS for antenna switching", 3GPP TSG RAN WG1 #99 R1-1911853, Nov. 2019, 9 pages.

* cited by examiner

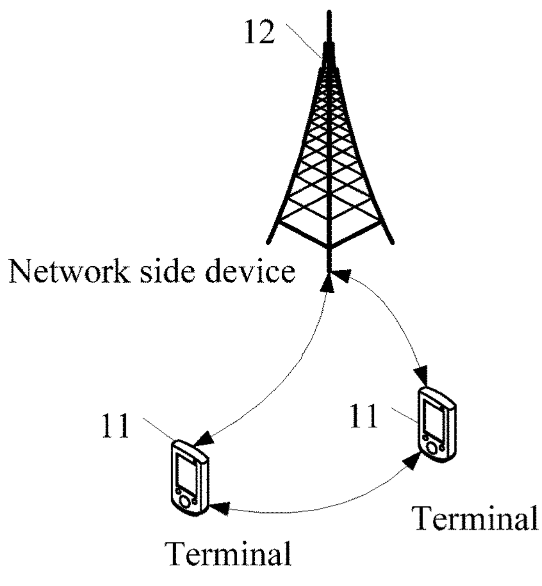

FIG. 1

200: A terminal determines a target guard period between two target sounding reference signal resources 210: The terminal transmits two target sounding reference signals based on the target sounding reference signal resources and the target guard period; where the two target sounding reference signal resources are any two sounding reference signal resources that are adjacent in the time domain within an antenna switching group; and one antenna switching group includes all sounding reference signal resources used to detect one piece of complete channel state information, and all sounding reference signal resources in the one antenna switching group are of the same resource type

FIG. 2

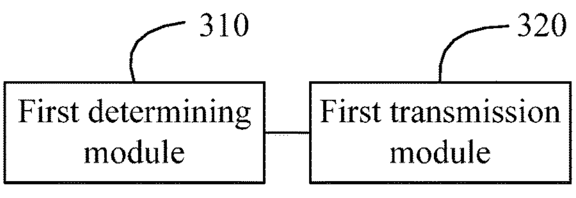

FIG. 3

GUARD PERIOD DETERMINATION METHOD AND APPARATUS, TERMINAL AND STORAGE MEDIUM

CROSS-REFERENCE TO RELATED APPLICATIONS

This application is a continuation of International Application No. PCT/CN2022/084774, filed Apr. 1, 2022, which claims priority to Chinese Patent Application No. 202110363885.1, filed Apr. 2, 2021. The entire contents of each of the above-referenced applications are expressly incorporated herein by reference.

TECHNICAL FIELD

The present application relates to the technical field of communication, and in particular relates to a guard period determination method and apparatus, a terminal and a storage medium.

BACKGROUND

A base station obtains downlink channel information by measuring an uplink Sounding Reference Signal (SRS) sent by a terminal, where the information is used for a Physical Downlink Shared Channel (PDSCH). When determining SRS resources, the terminal determines a guard period between two SRS resources. The guard period needs to be greater than the minimum guard period requirement, and when an SRS used for antenna switching conflicts with other signals, the guard period between SRS resources needs to be considered in the conflict priority determination.

When resources in an SRS resource set in the existing technology are transmitted in different slots, since an SRS can only be configured on the last 6 symbols, the minimum period requirement between two SRS resources can inevitably be met. If they are transmitted in the same slot, when more symbol resource configurations are supported, the large interval between SRS resources leads to a relatively large corresponding guard period, which wastes resources. In addition, the network in the existing technology supports only one periodic and semi-persistent resource set for antenna switching, and supports multiple aperiodic resource sets, but the multiple aperiodic resource sets need to be in adjacent slots. As more antenna switching configurations and symbol resource configurations are supported, two SRS resource sets may appear in the same slot, and the resources between the two SRS resource sets may not meet the minimum guard period requirement.

SUMMARY

The embodiments of the present application provide a guard period determination method and apparatus, a terminal, and a storage medium.

According to a first aspect, a guard period determination method is provided, which includes:

- determining, by a terminal, a target guard period between two target sounding reference signal resources; and
- transmitting, by the terminal, two target sounding reference signals based on the target sounding reference signal resources and the target guard period;
- where the two target sounding reference signal resources are any two sounding reference signal resources that are adjacent in the time domain within an antenna switching group; and
- where one antenna switching group includes all sounding reference signal resources used to detect one piece of complete channel state information, and all sounding reference signal resources in the one antenna switching group are of the same resource type.

According to a second aspect, a guard period determination apparatus is provided, which includes:

- a first determining module, configured to determine a target guard period between two target sounding reference signal resources; and
- a first transmission module, configured to transmit two target sounding reference signals based on the target sounding reference signal resources and the target guard period;
- where the two target sounding reference signal resources are any two sounding reference signal resources that are adjacent in the time domain within an antenna switching group; and
- where one antenna switching group includes all sounding reference signal resources used to detect one piece of complete channel state information, and all sounding reference signal resources in the one antenna switching group are of the same resource type.

According to a third aspect, a terminal is provided, where the terminal includes a processor, a memory, and a program or an instruction stored in the memory and executable on the processor, where when the program or instruction is executed by the processor, steps of the method according to the first aspect are implemented.

According to a fourth aspect, a terminal is provided, including a processor and a communication interface, where the processor is configured to:

- determining a target guard period between two target sounding reference signal resources; and
- transmitting two target sounding reference signals based on the target sounding reference signal resources and the target guard period;
- where the two target sounding reference signal resources are any two sounding reference signal resources that are adjacent in the time domain within an antenna switching group; and
- where one antenna switching group includes all sounding reference signal resources used to detect one piece of complete channel state information, and all sounding reference signal resources in the one antenna switching group are of the same resource type.

According to a fifth aspect, a readable storage medium is provided, where the readable storage medium stores a program or an instruction, and when the program or the instruction is executed by a processor, steps of the method according to the first aspect are implemented.

According to a sixth aspect, a chip is provided. The chip includes a processor and a communications interface, the communications interface is coupled to the processor, and the processor is configured to run a program or an instruction to implement steps of the method according to the first aspect.

According to a seventh aspect, a computer program/program product is provided, the computer program/program product is stored in a non-volatile storage medium, and the program/program product is executed by at least one processor to implement the steps of the method described in the first aspect.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

BRIEF DESCRIPTION OF DRAWINGS

FIG. 1 is a structural diagram of a wireless communication system to which this embodiment of the present application is applicable;

FIG. 2 is a flowchart of a guard period determination method according to an embodiment of the present application;

FIG. 3 is a schematic structural diagram of a guard period determination apparatus according to an embodiment of the present application;

DETAILED DESCRIPTION

Figure 4:
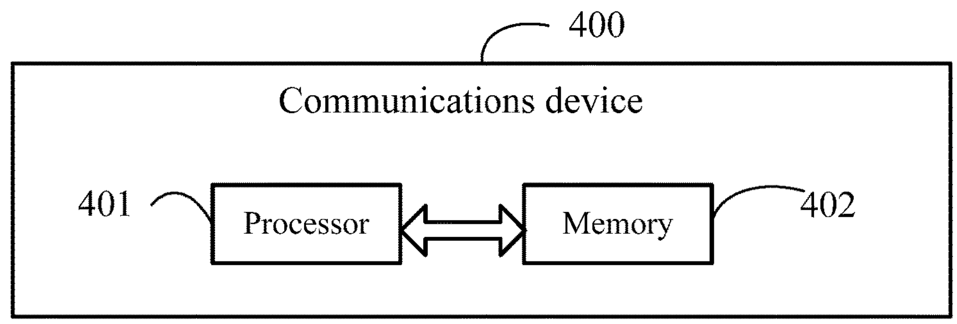
FIG. 4 is a schematic structural diagram of a communications device according to an embodiment of this application.

The following clearly describes technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the description and the claims, “and/or” represents at least one of connected objects, and a character “/” generally represents an “or” relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms “system” and “network” in the embodiments of this application may be used interchangeably. The technologies described can be applied to both the systems and the radio technologies mentioned above as well as to other systems and radio technologies. However, a New Radio (NR) system is described in the following descriptions for illustrative purposes, and the NR terminology is used in most of the following descriptions, although these techniques can also be applied to applications other than the NR system application, for example, the $6^{th}$ Generation (6G) communications system.

FIG. 1 is a block diagram of a wireless communications system to which an embodiment of this application can be applied. The wireless communications system includes a terminal 11 and a network side device 12. The terminal 11 may also be called a terminal device or User Equipment (UE), and the terminal 11 may be a mobile phone, a tablet personal computer, a laptop computer or a notebook computer, a personal digital Assistant (PDA), a palmtop computer, a netbook, an ultra-mobile personal computer (UMPC), a mobile Internet device (MID), augmented reality (AR)/virtual reality (VR) equipment, robot, wearable device, vehicle-mounted equipment (VUE), pedestrian terminal (PUE), smart home (home devices with wireless communication function, such as refrigerator, TV, washing machine or furniture), game console, personal computer (PC), teller machine or self-service machine and other terminal side equipment. The wearable device includes: smart watches, smart bracelets, smart headphones, smart glasses, smart jewelry (smart bracelets, smart bracelets, smart rings, smart necklaces, smart anklets, smart anklets, etc.), smart wristbands, smart clothing, etc. It should be noted that a specific type of the terminal 11 is not limited in this embodiment of this application. The network side device 12 may include an access network device or a core network device, where the access network device 12 may also be called a radio access network device, a Radio Access Network (RAN), a radio access network function or a radio access network unit. The access network device 12 may include a base station, a WLAN access point, or a WiFi node. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a WiFi node, a Transmitting Receiving Point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited. The core network device may include but is not limited to at least one of the following: core network nodes, core network functions, Mobility Management Entity (MME), Access and Mobility Management Function (AMF), Session Management Function (SMF), User Plane Function (UPF), Policy Control Function (PCF), policy and charging rules functions (PCRF), Edge Application Server Discovery Function (EASDF), Unified Data Management (UDM), Unified Data Repository (UDR), Home Subscriber Server (HSS), Centralized network configuration (CNC), Network Repository Function (NRF), Network Exposure Function (NEF), local NEFs (Local NEF, or L-NEF), Banding Support Function (BSF), Application Function (AF), etc. It should be noted that, in the embodiment of the present application, only the core network device in the NR system is used as an example for introduction, and the specific type of the core network device is not limited.

The guard period determination method and apparatus provided by the embodiments of the present application will be described in detail below through some embodiments and application scenarios with reference to the accompanying drawings.

First, the following contents are described:

(1) Antenna switching (for downlink channel acquisition):

The base station acquires downlink channel information by measuring an uplink SRS, where the information is used for downlink PDSCH precoding transmission.

The number of ports in the SRS resource is consistent with the number of terminal antenna ports (tx).

For antenna switching:

(a) 1T2R:

A maximum of 2 SRS resource sets are configured.

Each set has a different resourceType, that is, the periodic attributes are different, periodic/semi-persistent/aperiodic.

Each set is configured with 2 SRS resources. In a set, each SRS resource contains 1 port.

In a set, each SRS resource needs to be transmitted on a different symbol.

In a set, the UE uses different UE antenna ports to send different SRS resources.

(b) 2T4R:

A maximum of 2 SRS resource sets are configured.

Each set has a different resourceType, that is, the periodic attributes are different, periodic/semi-persistent/aperiodic.

Each set is configured with 2 SRS resources.

In a set, each SRS resource contains 2 ports.

In a set, each SRS resource needs to be transmitted on a different symbol.

In a set, one resource is sent by two UE antenna ports, and the other resource is sent by the other two UE antenna ports.

(c) 1T4R:

0 or 1 SRS resource set is configured; resourceType only supports periodic or semi-persistent.

4 SRS resources are configured.

Each SRS resource needs to be transmitted on a different symbol.

The UE uses different UE antenna ports to send different SRS resources.

(d) 1T4R:

0 or 2 SRS resource sets is configured. resourceType only supports aperiodic.

A total of 4 SRS resources are configured in the two sets.

Each SRS resource contains 1 port.

The SRS resource configured in the two sets is 2+2 or 1+3 or 3+1.

The values of alpha, p0, pathlossReferenceRS, and srs-PowerControlAdjustmentStates of the two sets are consistent.

The values of aperiodicSRS-ResourceTrigger or the value of an entry in AperiodicSRS-ResourceTriggerList of the two sets are consistent.

In addition, for an aperiodic SRS resource set, each set needs to be transmitted on two different slots.

An SRS is currently supported to be transmitted on the last 6 symbols; the slot offset of all resources in the aperiodic SRS resource set is configured at the set level, that is, the resources in the set are all on the same slot.

Therefore, it is necessary to ensure the guard period (GP) for antenna switching, and 6 symbols cannot accommodate4 resources at a time, and therefore it is necessary to mandate at least two sets, and the two sets are on different slots.

In addition, for periodic and semi-persistent SRS resource sets, each set does not need to be transmitted on two different slots; because the resource offset in the SRS set is configured at the resource level, that is, each resource in the set is different, even if a set contains 4 resources, a slotoffset at the resource level can be used to meet the GP requirement.

The resources in a set need to be transmitted on two different symbols.

Each SRS resource in the two sets is associated with a different antenna port of the UE.

(d) 1T1R/2T2R/4T4R: A maximum of 2 SRS resource sets are configured.

Each set is configured with 1 SRS resource.

The number of SRS ports in each resource is equal to 1/2/4, which is equal to the number of transmitting antennas.

As shown in Table 1, Table 1 is a table of a minimum protection period between two SRS resources of the SRS resource set used for antenna switching.

TABLE 1

Minimum guard period between two SRS resources of an SRS resource set for antenna switching

| $\mu$ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

FIG. 2 is a schematic flowchart of a guard period determination method according to an embodiment of the present application. As shown in FIG. 2, the method includes the following steps:

Step 200: A terminal determines a target guard period between two target sounding reference signal resources.

Step 210: The terminal transmits two target sounding reference signals based on the target sounding reference signal resources and the target guard period.

The two target sounding reference signal resources are any two sounding reference signal resources that are adjacent in the time domain within an antenna switching group; and where one antenna switching group includes all sounding reference signal resources used to detect one piece of complete channel state information, and all sounding reference signal resources in the one antenna switching group are of the same resource type.

In some embodiments, when the communication system supports more antenna switching configurations, the number of sets for antenna switching is large, and the number of resources in a set will also be large. Besides, for example, based on UE capabilities, an SRS can be supported to be configured on 14 symbols. The symbol position of the SRS can occupy any one of the 14 symbols. For example, antenna switching can be increased from a maximum of 4R to 8R, and 2T can also be increased to 4T, that is, at least one of the following configurations can be supported: 1T6R, 1T8R, 2T6R, 2T8R, 4T6R, or 4T8R.

In some embodiments, by determining the target guard period corresponding to any two sounding reference signal resources that are adjacent in the time domain in an antenna switching group, the guard period can be avoided from being too large. At the same time, since any two sounding reference signal resources that are adjacent in the time domain in an antenna switching group corresponding to the determined target guard period include SRS resources that are in different SRS resource sets but are adjacent in the time domain, it can effectively avoid that the last SRS resource in the previous SRS resource set and the first SRS resource in the subsequent SRS resource set among the two SRS resource sets is connected in a head-to-tail manner.

In some embodiments, the terminal may determine the target guard period of any two sounding reference signal resources that are adjacent in the time domain in an antenna switching group, and then the terminal may transmit two target sounding reference signals based on the target sounding reference signal resources and the target guard period.

In some embodiments, the symbol distance or slot distance involved in various embodiments of the present application may be equal to a symbol difference or a slot difference, or symbol difference+1 or slot difference+1, or symbol difference-1 or slot difference-1.

In some embodiments, the symbol distance or the slot distance may not include at least one of a downlink slot or a special slot, and the downlink slot may include a special slot including at least one downlink symbol or a special slot including all downlink symbols.

In some embodiments, one antenna switching group includes all sounding reference signal resources used to detect one piece of complete channel state information and may include activated or inactive resources. For example, an initial antenna switching group includes 4 resources, and only 2 resources are activated through MAC layer medium access control control information (MAC CE), and then the activated 2 resources are the antenna switching group, or even if only 2 resources are activated, the initial antenna switching group is the antenna switching group, which can be used for periodic, semi-persistent, and aperiodic.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

In some embodiments, the determining the target guard period of the two target sounding reference signal resources includes:

determining all symbols between the two target sounding reference signal resources as the target guard period.

In some embodiments, the terminal may determine that the target guard period includes all symbol periods between two SRS resources that are adjacent in the time domain. In some embodiments, the terminal may determine two target sounding reference signals based on the target sounding the target guard period.

In some embodiments, the sounding reference signal resource set containing the two target sounding reference signal resources satisfies at least one of the following:

- a guard period between multiple sounding reference signal resources used for antenna switching in one sounding reference signal resource set is greater than a minimum guard period; or a guard period between sounding reference signal resources used for antenna switching in multiple sounding reference signal resource sets is greater than a minimum guard period; or
- multiple sounding reference signal resource sets are sent in a same slot; or
- a guard period between multiple sounding reference signal resources used for antenna switching in one sounding reference signal resource set is less than a maximum guard period; or
- a guard period between sounding reference signal resources used for antenna switching in multiple sounding reference signal resource sets is less than a maximum guard period.

In some embodiments, the terminal does not expect that the symbol distance between multiple SRS resources used for antenna switching in one SRS resource set is greater than the minimum guard period.

In some embodiments, when the terminal determines the target guard period of two target sounding reference signal resources, the sounding reference signal resource set containing the two target sounding reference signal resources satisfies: a guard period between multiple sounding reference signal resources used for antenna switching in one sounding reference signal resource set is greater than a minimum guard period.

In some embodiments, the terminal does not expect that the symbol distance between SRS resources used for antenna switching in multiple SRS resource sets is greater than the minimum guard period.

In some embodiments, when the terminal determines the target guard period of two target sounding reference signal resources, the sounding reference signal resource set containing the two target sounding reference signal resources satisfies: a guard period between sounding reference signal resources used for antenna switching in multiple sounding reference signal resource sets is greater than a minimum guard period.

In some embodiments, the at least one SRS resource set is sent in the same slot.

In some embodiments, when the terminal determines the target guard period of two target sounding reference signal resources, the sounding reference signal resource set containing the two target sounding reference signal resources satisfies: multiple sounding reference signal resource sets are sent in the same slot.

In some embodiments, the terminal does not expect that the symbol or slot distance between multiple SRS resources used for antenna switching in one SRS resource set is less than the maximum guard period.

In some embodiments, when the terminal determines the target guard period of two target sounding reference signal resources, the sounding reference signal resource set containing the two target sounding reference signal resources satisfies: a guard period between multiple sounding reference signal resources used for antenna switching in one sounding reference signal resource set is less than the maximum guard period.

In some embodiments, the terminal does not expect that the symbol distance or slot distance between SRS resources used for antenna switching in multiple SRS resource sets is less than the maximum guard period.

In some embodiments, when the terminal determines the target guard period of two target sounding reference signal resources, the sounding reference signal resource set containing the two target sounding reference signal resources satisfies: a guard period between sounding reference signal resources used for antenna switching in multiple sounding reference signal resource sets is less than the maximum guard period.

In some embodiments, the maximum guard period includes a maximum slot period or a maximum symbol period.

In some embodiments, the maximum guard period may be in units of slots or symbols.

In some embodiments, the maximum guard period may be a maximum slot period.

In some embodiments, the maximum guard period may be a maximum symbol period.

In some embodiments, the maximum guard period is determined based on at least one of terminal capability, subcarrier spacing, network indication, or protocol pre-definition.

In some embodiments, the maximum interval may be determined by at least one item such as terminal capability, subcarrier interval, network configuration, and protocol agreement.

In some embodiments, the determining the target guard period of the two target sounding reference signal resources includes:

determining a target guard period of the two target sounding reference signal resources based on time domain positions of the two target sounding reference signal resources.

In some embodiments, the target guard period may not necessarily be between two target sounding reference signal S resources, and instead is adjacent to two target sounding reference signal resources; therefore, the target guard period of the two target sounding reference signal resources may be determined based on time domain positions of the two target sounding reference signal resources.

In some embodiments, since not all symbols between two target sounding reference signal resources are used as the target guard period, the defect that the guard period is too large can be effectively solved, and it is set that there is the guard period between any two target guard periods, to effectively solve the defect that the guard period between adjacent sounding reference signal resource sets does not meet the requirement.

In some embodiments, the determining the target guard period of the two target sounding reference signal resources based on the time domain positions of the two target sounding reference signal resources includes:

determining that a size of the target guard period is a first guard period size; and determining that a time domain position of the target guard period is located in a symbol adjacent to the two target sounding reference signal resources; where the first guard period size is determined based on at least one of terminal capability, subcarrier spacing, network configuration, protocol agreement, or the like, or based on the minimum guard period.

In some embodiments, the first guard period size, that is, the size of the target guard period, can be determined based on at least one item such as terminal capability, subcarrier spacing, network configuration, protocol agreement, etc.; and the target guard period and the two target sounding reference signal resources are located in adjacent symbols, and then the specific time domain position of the target guard period can be determined based on the positions of the two target sounding reference signal resources and the size of the target guard period.

In some embodiments, the size of the existing minimum guard period can be determined as the target guard period, and the target guard period and the two target sounding reference signal resources are located in adjacent symbols, and then the specific time domain position of the target guard period can be determined based on the positions of the two target sounding reference signal resources and the size of the target guard period.

In some embodiments, the determining the target guard period of the two target sounding reference signal resources based on the time domain positions of the two target sounding reference signal resources includes:

in a case that the number of target guard periods between the two target sounding reference signal resources is 1, determining that the target guard period is located after a first target sounding reference signal resource;

where the first target sounding reference signal resource is a sounding reference signal resource located in the front among the two target sounding reference signal resources.

In some embodiments, the terminal may determine that the target guard period is between two target sounding reference signal resources.

In some embodiments, the terminal may determine that there is a target guard period between two SRS resources.

Therefore, the terminal can determine that the time domain position of the target guard period is located behind the first target sounding reference signal resource.

In some embodiments, the first target sounding reference signal resource is a sounding reference signal resource located in the front in the time domain among the two target sounding reference signal resources.

In some embodiments, the determining the target guard period of the two target sounding reference signal resources based on the time domain positions of the two target sounding reference signal resources includes:

in a case that the number of target guard periods between the two target sounding reference signal resources is 1, determining that the target guard period is located before a second target sounding reference signal resource;

where the second target sounding reference signal resource is a sounding reference signal resource located in the rear among the two target sounding reference signal resources.

In some embodiments, the terminal may determine that the target guard period is between two target sounding reference signal resources.

In some embodiments, the terminal may determine that there is a target guard period between two SRS resources.

Therefore, the terminal can determine that the time domain position of the target guard period is located before the second target sounding reference signal resource.

In some embodiments, the second target sounding reference signal resource is a sounding reference signal resource located in the rear in the time domain among the two target sounding reference signal resources. In some embodiments, the determining the target guard period of the two target sounding reference signal resources based on the time domain positions of the two target sounding reference signal resources includes:

in a case that the number of target guard periods between the two target sounding reference signal resources is 2, determining that the target guard period includes a first target guard period and a second target guard period;

where the first target guard period is located after the first target sounding reference signal resource, and the second target guard period is located before the second target sounding reference signal resource.

In some embodiments, the terminal may determine that the target guard period is between two target sounding reference signal resources.

In some embodiments, the terminal may determine that there are two target guard periods between the two SRS resources, that is, a first target guard period and a second target guard period.

Therefore, the terminal may determine that the first target guard period is located after the time domain position of the first target sounding reference signal resource, and the second target guard period is located before the time domain position of the second target sounding reference signal resource.

In some embodiments, the first target sounding reference signal resource is a sounding reference signal resource located in the front in the time domain among the two target sounding reference signal resources.

In some embodiments, the second target sounding reference signal resource is a sounding reference signal resource located in the rear in the time domain among the two target sounding reference signal resources.

In some embodiments, the first target guard period and the second target guard period are the same or different.

In some embodiments, the first target guard period and the second target guard period may be the same, that is, the positions in the time domain are the same;

In some embodiments, the first target guard period and the second target guard period may be different, that is, have different positions in the time domain.

In some embodiments, the determining the target guard period of the two target sounding reference signal resources based on the time domain positions of the two target sounding reference signal resources includes:

- determining that a third target guard period is before its corresponding target sounding reference signal resource; and
- determining that a fourth target guard period is behind its corresponding target sounding reference signal resource;
- where one target sounding reference signal resource corresponds to two target guard periods, and the two target guard periods include the third target guard period and the fourth target guard period.

In some embodiments, the terminal may determine that each of the two SRS resources has two target guard periods, that is, each target sounding reference signal resource has its own third target guard period and fourth target guard period.

In some embodiments, for the two target sounding reference signal resources, that is, SRS resource 1 and SRS resource 2, the third guard period GP1 of SRS resource 1 is located before the SRS resource 1, the fourth guard period GP2 of SRS resource 1 is located after the SRS resource 1; the third guard period GP3 of SRS resource 2 is located before the SRS resource 2, and the fourth guard period GP4 of SRS resource 2 is located after the SRS resource 2.

In some embodiments, the third target guard period and the fourth target guard period are the same or different.

In some embodiments, for a target sounding reference signal resource, its third target guard period and fourth target guard period may be the same, that is, the positions in the time domain are exactly the same.

In some embodiments, for a target sounding reference signal resource, its third target guard period and fourth target guard period may be different, that is, the positions in the time domain are not completely the same.

In some embodiments, the two target sounding reference signal resources satisfy at least one of the following:

- associated sounding reference signal resource set numbers are the same;
- carrier numbers are the same;
- subset bandwidth numbers are the same;
- sounding reference signal resource numbers are different;
- slot offsets are the same;
- slot offsets are different;
- period parameters among period and offset parameters are the same;
- offset parameters among period and offset parameters are the same;
- offset parameters among period and offset parameters are different;
- symbol position indexes are different; or
- time domain position orders are different.

In some embodiments, the two target sounding reference signal resources may be determined based on at least one of the following:

- sounding reference signal resource set SRS resource set ID;
- carrier number CC ID;
- subset bandwidth number BWP ID;
- sounding reference signal resource number SRS resource ID;
- slot offset;
- period and offset parameter PeriodicityAndOffset; or
- symbol position index (corresponding symbol position order).

Therefore, the two target sounding reference signal resources may satisfy any one or any combination of the following:

- associated sounding reference signal resource set numbers are the same;
- carrier numbers are the same;
- subset bandwidth numbers are the same;
- sounding reference signal resource numbers are different;
- slot offsets are the same;
- slot offsets are different;
- period parameters among period and offset parameters are the same;
- offset parameters among period and offset parameters are the same;
- offset parameters among period and offset parameters are different;
- symbol position indexes are different; and
- time domain position orders are different.

In some embodiments, the transmitting, by the terminal, two target sounding reference signals based on the target sounding reference signal resources and the target guard period includes:

- transmitting at least one of the following through a symbol that is not used as the target guard period and that is between the two target sounding reference signal resources:
- Physical Uplink Shared Channel (PUSCH), Physical Random Access Channel (PRACH), and Physical Uplink Control Channel (PUCCH).

In some embodiments, since not all symbols between two target sounding reference signal resources may be used as target guard periods, symbols of non-target guard periods between the two target sounding reference signal resources may be used to transmit any one or any combination of a PUSCH, a PRACH, and a PUCCH.

In some embodiments, the symbol or slot distance between the two target sounding reference signal resources is less than the maximum guard period.

In some embodiments, the terminal does not expect that the symbol or slot distance between two SRS resources is less than the maximum interval.

In some embodiments, when the terminal determines the target guard period of two target sounding reference signal resources, the sounding reference signal resource set containing the two target sounding reference signal resources satisfies: the symbol or slot distance between the two target sounding reference signal resources is less than the maximum guard period.

In some embodiments, the maximum guard period includes a maximum slot period or a maximum symbol period.

In some embodiments, the maximum guard period may be in units of slots or symbols.

In some embodiments, the maximum guard period may be a maximum slot period.

In some embodiments, the maximum guard period may be a maximum symbol period.

In some embodiments, the maximum guard period is determined based on at least one of terminal capability, subcarrier spacing, network indication, or protocol pre-definition.

In some embodiments, the maximum interval may be determined by at least one item such as terminal capability, subcarrier interval, network configuration, and protocol agreement.

In some embodiments, the transmitting two target sounding reference signals based on the target sounding reference signal resources and the target guard period includes:

in a case that the usage associated with the sounding reference signal resource or the sounding reference signal resource set includes antenna switching and a codebook, or in a case that the sounding reference signal resource or the sounding reference signal resource set can be used for antenna switching and codebook-based transmission at the same time, and the number of guard periods is 1 or 2, skipping using the guard period.

In some embodiments, when the usage configured or associated in the SRS resource or the SRS resource set includes antenna switching and a codebook, that is, antenna switching+codebook, or indicates that it can be used for antenna switching and codebook-based transmission at the same time, and the SRS resource corresponds to only one target guard period GP or two target guard periods GP, the one or two target guard periods GP can be ignored.

In some embodiments, GPs that are ignored may not participate in the multiplexing priority rule between the SRS and other signals or channels.

In some embodiments, the transmitting two target sounding reference signals based on the target sounding reference signal resources and the target guard period includes:

determining that a sending port of the sounding reference signal resource is consistent with a sending port of a PUSCH.

In some embodiments, when the usage configured or associated in the SRS resource or the SRS resource set includes antenna switching and a codebook, that is, antenna switching+codebook, or indicates that it can be used for antenna switching and codebook-based transmission at the same time, the UE expects that a sending port of the PUSCH is consistent with a sending port of the SRS resource.

In some embodiments, when the usage configured or associated in the SRS resource or the SRS resource set includes antenna switching and a codebook, that is, antenna switching+codebook, or indicates that it can be used for antenna switching and codebook-based transmission at the same time, the terminal may determine that the sending port of the sounding reference signal resource is consistent with the sending port of the PUSCH.

In some embodiments, in a case that resource types of the two target sounding reference signal resources are periodic or semi-persistent, the two target sounding reference signals satisfy at least one of the following:

the two target sounding reference signal resources are associated with a same target sounding reference signal resource set;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same; and the two target sounding reference signal resources are sent on a same slot.

In some embodiments, the antenna switching groups where the two target sounding reference signals are located may satisfy that the resourceType (periodic/semi-persistent/aperiodic) is the same.

In some embodiments, in a case that resource types of the two target sounding reference signal resources are periodic or semi-persistent, the two target sounding reference signals satisfy any one or any combination of the following:

the two target sounding reference signal resources are associated with a same target sounding reference signal resource set;

the usage configured in the two target sounding reference signal resources includes antenna switching;

path loss influence coefficients alpha configured or associated in the two target sounding reference signal resources are the same;

network reception expected powers p0 configured or associated in the two target sounding reference signal resources are the same;

path loss reference signals pathlossReferenceRS configured or associated in the two target sounding reference signal resources are the same;

sounding reference signal power control adjustment states srs-PowerControlAdjustmentStates configured or associated in the two target sounding reference signal resources are the same; and the two target sounding reference signal resources are sent on a same slot.

In some embodiments, when the resource types of the two target sounding reference signal resources are aperiodic, the two target sounding reference signal resources satisfy at least one of the following:

the two target sounding reference signal resources are associated with different target sounding reference signal resource sets;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same;

aperiodic sounding reference signal resource triggers configured or associated in the two target sounding reference signal resources are the same;

aperiodic sounding reference signal resource trigger lists configured or associated in the two target sounding reference signal resources are the same;

the two target sounding reference signal resources are sent on a same slot;

slot offsets configured or associated in the two target sounding reference signal resources are the same; or valid slot offsets configured or associated in the two target sounding reference signal resources are the same.

In some embodiments, in a case that resource types of the two target sounding reference signal resources are aperiodic, the two target sounding reference signals satisfy any one or any combination of the following:

the two target sounding reference signal resources are associated with different target sounding reference signal resource sets;

the usage configured in the two target sounding reference signal resources includes antenna switching;

path loss influence coefficients alpha configured or associated in the two target sounding reference signal resources are the same;

network reception expected powers p0 configured or associated in the two target sounding reference signal resources are the same;

path loss reference signals pathlossReferenceRS configured or associated in the two target sounding reference signal resources are the same;

sounding reference signal power control adjustment states srs-PowerControlAdjustmentStates configured or associated in the two target sounding reference signal resources are the same; and aperiodic sounding reference signal resource triggers aperiodicSRS-ResourceTrigger configured or associated in the two target sounding reference signal resources are the same;

aperiodic sounding reference signal resource trigger lists AperiodicSRS-ResourceTriggerList configured or associated in the two target sounding reference signal resources are the same;

the two target sounding reference signal resources are sent on a same slot;

slot offsets configured or associated in the two target sounding reference signal resources are the same; and valid slot offsets Slot offset configured or associated in the two target sounding reference signal resources are the same.

In some embodiments, the determining the target guard period of the two target sounding reference signal resources includes:

using a same closed-loop power control parameter value for sounding reference signal resources in the antenna switching group;

where the closed-loop power control parameter value is determined according to a sounding reference signal resource sent first in the antenna switching group.

In some embodiments, for at least one SRS resource in the antenna switching group, the same closed-loop power control parameter value can be used, that is, a closed-loop power control parameter value of an SRS resource sent first in the antenna switching group, that is, parameter $h_{b,f,c}(i,l)$ In some embodiments, the closed-loop power control parameter value is determined according to a sounding reference signal resource sent first in the antenna switching group.

In some embodiments, the closed-loop power control parameter value includes a closed-loop power control accumulated value and or a closed-loop power control specified value.

In some embodiments, the determining the target guard period of the two target sounding reference signal resources includes:

before a sounding reference signal resource transmitted first in the time domain, and after a sounding reference signal resource transmitted last in the time domain, skipping determining the guard period.

In some embodiments, before the SRS resource sent first in the time domain and after the SRS resource sent last in the time domain, the guard period may not be determined.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

It should be noted that, the guard period determination method provided in the embodiment of the present application may be executed by a guard period determination apparatus, or a control module in the guard period determination apparatus for executing the guard period determination method. In the embodiment of the present application, the guard period determination apparatus provided in the embodiment of the present application is described by taking the guard period determination method being performed by the guard period determination apparatus as an example.

FIG. 3 is a schematic structural diagram of a guard period determination apparatus provided in an embodiment of the present application. As shown in FIG. 3, the apparatus includes: a first determining module 310 and a first transmission module 320.

The first determining module 310 is configured to determine a target guard period between two target sounding reference signal resources.

The first transmission module 320 is configured to transmit two target sounding reference signals based on the target sounding reference signal resources and the target guard period.

The two target sounding reference signal resources are any two sounding reference signal resources that are adjacent in the time domain within an antenna switching group; and where one antenna switching group includes all sounding reference signal resources used to detect one piece of complete channel state information, and all sounding reference signal resources in the one antenna switching group are of the same resource type.

In some embodiments, in the guard period determination apparatus, the first determining module 310 may determine a target guard period between two target sounding reference signal resources; and the first transmission module 320 transmits two target sounding reference signals based on the target sounding reference signal resources and the target guard period; where the two target sounding reference signal resources are any two sounding reference signal resources that are adjacent in the time domain within an antenna switching group; and one antenna switching group includes all sounding reference signal resources used to detect one piece of complete channel state information, and all sounding reference signal resources in the one antenna switching group are of the same resource type.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

In some embodiments, the first determining module is further configured to:

determine all symbols between the two target sounding reference signal resources as the target guard period.

In some embodiments, the sounding reference signal resource set containing the two target sounding reference signal resources satisfies at least one of the following:

a guard period between multiple sounding reference signal resources used for antenna switching in one sounding reference signal resource set is greater than a minimum guard period; or a guard period between sounding reference signal resources used for antenna switching in multiple sounding reference signal resource sets is greater than a minimum guard period; or multiple sounding reference signal resource sets are sent in a same slot; or a guard period between multiple sounding reference signal resources used for antenna switching in one sounding reference signal resource set is less than a maximum guard period; or a guard period between sounding reference signal resources used for antenna switching in multiple sounding reference signal resource sets is less than a maximum guard period.

In some embodiments, the maximum guard period includes a maximum slot period or a maximum symbol period.

In some embodiments, the maximum guard period is determined based on at least one of terminal capability, subcarrier spacing, network indication, or protocol predefinition.

In some embodiments, the first determining module is further configured to:

determine a target guard period of the two target sounding reference signal resources based on time domain positions of the two target sounding reference signal resources. In some embodiments, the first determining module is further configured to:

determine that a size of the target guard period is a first guard period size; and determine that a time domain position of the target guard period is located in a symbol adjacent to the two target sounding reference signal resources; where the first guard period size is determined based on at least one of terminal capability, subcarrier spacing, network configuration, protocol agreement, or the like, or based on the minimum guard period.

In some embodiments, the first determining module is further configured to:

in a case that the number of target guard periods between the two target sounding reference signal resources is 1, determine that the target guard period is located after a first target sounding reference signal resource;

where the first target sounding reference signal resource is a sounding reference signal resource located in the front among the two target sounding reference signal resources.

In some embodiments, the first determining module is further configured to:

in a case that the number of target guard periods between the two target sounding reference signal resources is 1, determine that the target guard period is located before a second target sounding reference signal resource;

where the second target sounding reference signal resource is a sounding reference signal resource located in the rear among the two target sounding reference signal resources.

In some embodiments, the first determining module is further configured to:

in a case that the number of target guard periods between the two target sounding reference signal resources is 2, determine that the target guard period includes a first target guard period and a second target guard period;

where the first target guard period is located after the first target sounding reference signal resource, and the second target guard period is located before the second target sounding reference signal resource.

In some embodiments, the first target guard period and the second target guard period are the same or different.

In some embodiments, the first determining module is further configured to:

determine that a third target guard period is before its corresponding target sounding reference signal resource; and determine that a fourth target guard period is behind its corresponding target sounding reference signal resource;

where one target sounding reference signal resource corresponds to two target guard periods, and the two target guard periods include the third target guard period and the fourth target guard period.

In some embodiments, the third target guard period and the fourth target guard period are the same or different.

In some embodiments, the two target sounding reference signal resources satisfy at least one of the following:

associated sounding reference signal resource set numbers are the same;

carrier numbers are the same;

subset bandwidth numbers are the same;

sounding reference signal resource numbers are different;

slot offsets are the same;

slot offsets are different;

period parameters among period and offset parameters are the same;

offset parameters among period and offset parameters are the same;

offset parameters among period and offset parameters are different;

symbol position indexes are different; or time domain position orders are different.

In some embodiments, the first transmission module is further configured to:

transmit at least one of the following through a symbol that is not used as the target guard period and that is between the two target sounding reference signal resources:

PUSCH, PRACH, or PUCCH.

In some embodiments, the symbol or slot distance between the two target sounding reference signal resources is less than the maximum guard period.

In some embodiments, the maximum guard period includes a maximum slot period or a maximum symbol period.

In some embodiments, the maximum guard period is determined based on at least one of terminal capability, subcarrier spacing, network indication, and protocol predefinition.

In some embodiments, the first transmission module is further configured to:

in a case that the usage associated with the sounding reference signal resource or the sounding reference signal resource set includes antenna switching and a codebook, or in a case that the sounding reference signal resource or the sounding reference signal resource set can be used for antenna switching and codebook-based transmission at the same time, and the number of guard periods is 1 or 2, skip using the guard period.

In some embodiments, the first transmission module is further configured to:

determine that a sending port of the sounding reference signal resource is consistent with a sending port of a PUSCH.

In some embodiments, in a case that resource types of the two target sounding reference signal resources are periodic or semi-persistent, the two target sounding reference signals satisfy at least one of the following:

the two target sounding reference signal resources are associated with a same target sounding reference signal resource set;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same; or the two target sounding reference signal resources are sent on a same slot.

In some embodiments, when the resource types of the two target sounding reference signal resources are aperiodic, the two target sounding reference signal resources satisfy at least one of the following:

the two target sounding reference signal resources are associated with different target sounding reference signal resource sets;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same;

aperiodic sounding reference signal resource triggers configured or associated in the two target sounding reference signal resources are the same;

aperiodic sounding reference signal resource trigger lists configured or associated in the two target sounding reference signal resources are the same;

the two target sounding reference signal resources are sent on a same slot;

slot offsets configured or associated in the two target sounding reference signal resources are the same; or valid slot offsets configured or associated in the two target sounding reference signal resources are the same.

In some embodiments, the first determining module is further configured to:

use a same closed-loop power control parameter value for sounding reference signal resources in the antenna switching group;

where the closed-loop power control parameter value is determined according to a sounding reference signal resource sent first in the antenna switching group.

In some embodiments, the first determining module is further configured to:

before a sounding reference signal resource transmitted first in the time domain, and after a sounding reference signal resource transmitted last in the time domain, skip determining the guard period.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

The guard period determination apparatus in the embodiment of the present application may be an apparatus, an apparatus with an operating system or an electronic device, or a component, an integrated circuit, or a chip in a terminal. The apparatus or electronic equipment may be a mobile terminal or a non-mobile terminal. For example, the mobile terminal may include but is not limited to the foregoing listed types of terminals 11. The non-mobile terminal may be a server, a Network Attached Storage (NAS), a personal computer (PC), a television (TV), a teller machine, or a self-service machine. This is not specifically limited in this embodiment of this application.

The guard period determination apparatus in the embodiment of the present application may be an apparatus with an operating system. The operating system may be an Android operating system, an iOS operating system, or another possible operating system, which is not specifically limited in the embodiments of this application.

The guard period determination apparatus provided in the embodiment of the present application can realize each process realized by the method embodiment in FIG. 2 and achieve the same technical effect. To avoid repetition, details are not repeated here.

In some embodiments, FIG. 4 is a schematic structural diagram of a communication device provided by the embodiment of the present application. As shown in FIG. 4, the embodiment of the present application also provides a communication device 400, including a processor 401, a memory 402, and a program or instruction stored in the memory 402 and operable on the processor 401. For example, when the communication device 400 is a terminal, the program or instruction is executed by the processor 401 to implement the various processes of the above guard period determination method, and can achieve the same technical effect. When the communication device 400 is a network side device, when the programs or instructions are executed by the processor 401, each process of the above embodiment of the guard period determination method is performed, and the same technical effect can be achieved. To avoid repetition, details are not repeated herein.

Figure 5:
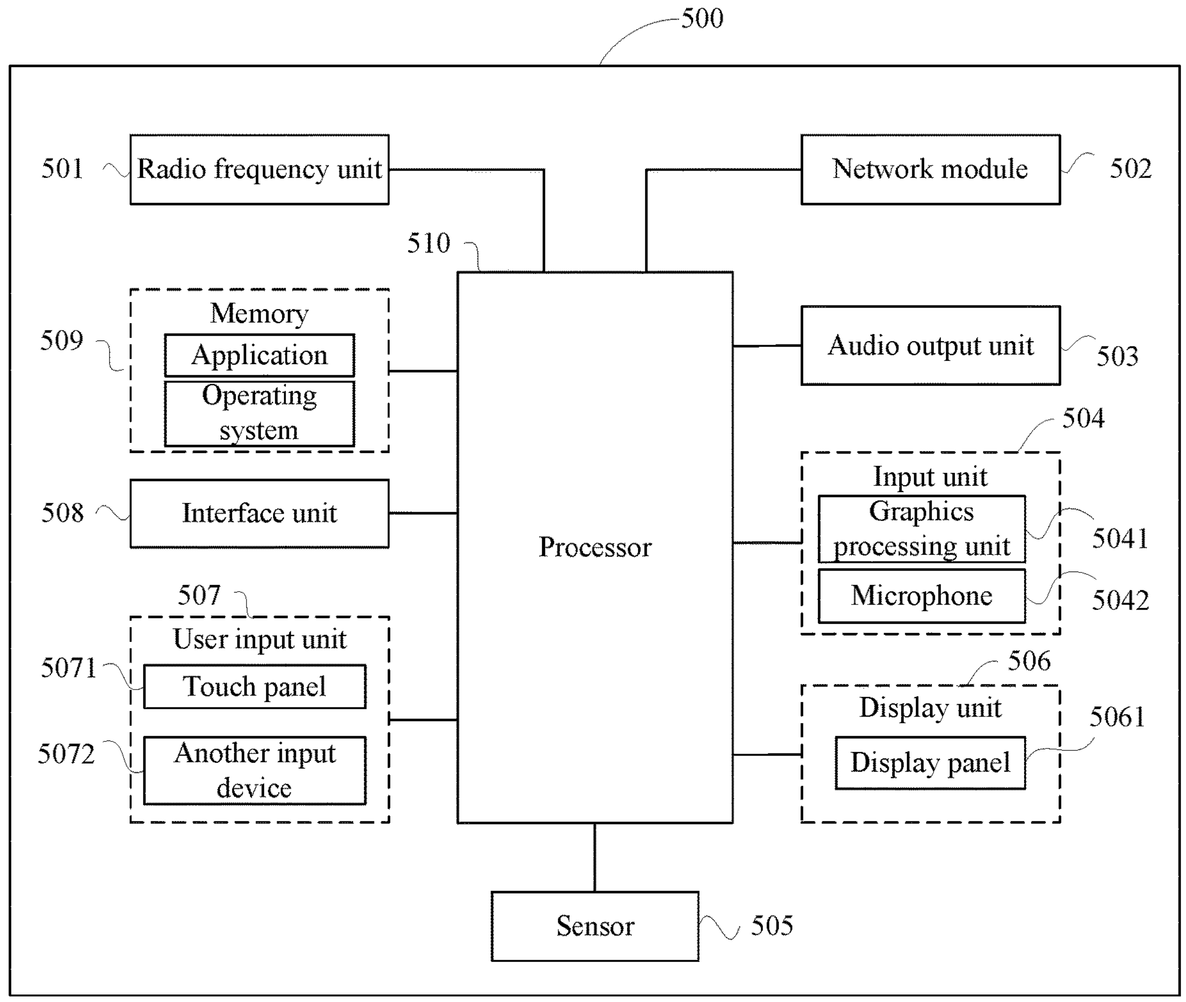
FIG. 5 is a schematic diagram of a hardware structure of a terminal according to an embodiment of this application.

An embodiment of the present application further provides a terminal, including a processor and a communication interface, the processor is configured to determine a target guard period between two target sounding reference signal resources; and transmit two target sounding reference signals based on the target sounding reference signal resources and the target guard period; where the two target sounding reference signal resources are any two sounding reference signal resources that are adjacent in the time domain within an antenna switching group; and one antenna switching group includes all sounding reference signal resources used to detect one piece of complete channel state information, and all sounding reference signal resources in the one antenna switching group are of the same resource type. This terminal embodiment corresponds to the above-mentioned method embodiment on the terminal side, and each implementation process and implementation manner of the above-mentioned method embodiment can be applied to this terminal embodiment, and can achieve the same technical effect. FIG. 5 is a schematic diagram of a hardware structure of a terminal provided by an embodiment of this application.

A terminal 500 includes but is not limited to at least a part of components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the terminal 500 may further include a power supply (such as a battery) that supplies power to each component. The power supply may be logically connected to the processor 510 by using a power supply management system, to implement functions such as charging and discharging management, and power consumption management by using the power supply management system. The terminal structure shown in FIG. 5 constitutes no limitation on the terminal, and the terminal may include more or fewer components than those shown in the figure, or combine some components, or have different component arrangements. Details are not described herein.

It should be understood that, in this embodiment of this application, the input unit 504 may include a Graphics Processing Unit (GPU) 5041 and a microphone 5042, and the graphics processing unit 5041 processes image data of a still picture or a video obtained by an image capture apparatus (such as a camera) in a video capture mode or an image capture mode. The display unit 506 may include a display panel 5061. In some embodiments, the display panel 5061 may be configured in a form such as a liquid crystal display or an organic light-emitting diode. The user input unit 507 includes a touch panel 5071 and another input device 5072. The touch panel 5071 is also known as a touch screen. The touch panel 5071 may include two parts: a touch detection apparatus and a touch controller. The another input device 5072 may include but is not limited to a physical keyboard, a functional button (such as a volume control button or a power on/off button), a trackball, a mouse, and a joystick. Details are not described herein.

In this embodiment of this application, the radio frequency unit 501 receives downlink data from a network side device and then sends the downlink data to the processor 510 for processing; and sends uplink data to the network side device. Usually, the radio frequency unit 501 includes but is not limited to an antenna, at least one amplifier, a transceiver, a coupler, a low noise amplifier, a duplexer, and the like.

The memory 509 may be configured to store a software program or an instruction and various data. The memory 509 may mainly include a program or instruction storage area and a data storage area, where the program or instruction storage area may store an operating system, an application program or instructions required by at least one function (such as a sound playback function, an image playback function, etc.) and the like. In addition, the memory 509 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 510 may include one or more processing units. In some embodiments, an application processor and a modem processor may be integrated into the processor 510. The application processor mainly processes an operating system, a user interface, an application, an instruction, or the like. The modem processor mainly processes wireless communications, for example, a baseband processor. It can be understood that, the modem processor may not be integrated into the processor 510.

the processor 510 is configured to:

determine a target guard period between two target sounding reference signal resources; and transmit two target sounding reference signals based on the target sounding reference signal resources and the target guard period;

where the two target sounding reference signal resources are any two sounding reference signal resources that are adjacent in the time domain within an antenna switching group; and where one antenna switching group includes all sounding reference signal resources used to detect one piece of complete channel state information, and all sounding reference signal resources in the one antenna switching group are of the same resource type.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

In some embodiments, the processor 510 is configured to:

determine all symbols between the two target sounding reference signal resources as the target guard period.

In some embodiments, the sounding reference signal resource set containing the two target sounding reference signal resources satisfies at least one of the following:

a guard period between multiple sounding reference signal resources used for antenna switching in one sounding reference signal resource set is greater than a minimum guard period; or a guard period between sounding reference signal resources used for antenna switching in multiple sounding reference signal resource sets is greater than a minimum guard period; or multiple sounding reference signal resource sets are sent in a same slot; or a guard period between multiple sounding reference signal resources used for antenna switching in one sounding reference signal resource set is less than a maximum guard period; or a guard period between sounding reference signal resources used for antenna switching in multiple sounding reference signal resource sets is less than a maximum guard period.

In some embodiments, the maximum guard period includes a maximum slot period or a maximum symbol period.

In some embodiments, the maximum guard period is determined based on at least one of terminal capability, subcarrier spacing, network indication, or protocol predefinition.

In some embodiments, the processor 510 is configured to:

determine a target guard period of the two target sounding reference signal resources based on time domain positions of the two target sounding reference signal resources.

In some embodiments, the processor 510 is configured to:

determine that a size of the target guard period is a first guard period size; and determine that a time domain position of the target guard period is located in a symbol adjacent to the two target sounding reference signal resources; where the first guard period size is determined based on at least one of terminal capability, subcarrier spacing, network configuration, protocol agreement, or the like, or based on the minimum guard period.

In some embodiments, the processor 510 is configured to:

in a case that the number of target guard periods between the two target sounding reference signal resources is 1, determine that the target guard period is located after a first target sounding reference signal resource;

where the first target sounding reference signal resource is a sounding reference signal resource located in the front among the two target sounding reference signal resources.

In some embodiments, the processor 510 is configured to:

in a case that the number of target guard periods between the two target sounding reference signal resources is 1, determine that the target guard period is located before a second target sounding reference signal resource;

where the second target sounding reference signal resource is a sounding reference signal resource located in the rear among the two target sounding reference signal resources.

In some embodiments, the processor 510 is configured to:

in a case that the number of target guard periods between the two target sounding reference signal resources is 2, determine that the target guard period includes a first target guard period and a second target guard period;

where the first target guard period is located after the first target sounding reference signal resource, and the second target guard period is located before the second target sounding reference signal resource.

In some embodiments, the first target guard period and the second target guard period are the same or different.

In some embodiments, the processor 510 is configured to:

determine that a third target guard period is before its corresponding target sounding reference signal resource; and determine that a fourth target guard period is behind its corresponding target sounding reference signal resource;

where one target sounding reference signal resource corresponds to two target guard periods, and the two target guard periods include the third target guard period and the fourth target guard period.

In some embodiments, the third target guard period and the fourth target guard period are the same or different.

In some embodiments, the two target sounding reference signal resources satisfy at least one of the following:

associated sounding reference signal resource set numbers are the same;

carrier numbers are the same;

subset bandwidth numbers are the same;

sounding reference signal resource numbers are different;

slot offsets are the same;

slot offsets are different;

period parameters among period and offset parameters are the same;

offset parameters among period and offset parameters are the same;

offset parameters among period and offset parameters are different;

symbol position indexes are different; or time domain position orders are different.

In some embodiments, the processor 510 is configured to:

transmit at least one of the following through a symbol that is not used as the target guard period and that is between the two target sounding reference signal resources:

physical uplink shared channel (PUSCH), physical random access channel (PRACH), or PUCCH.

In some embodiments, the symbol or slot distance between the two target sounding reference signal resources is less than the maximum guard period.

In some embodiments, the maximum guard period includes a maximum slot period or a maximum symbol period.

In some embodiments, the maximum guard period is determined based on at least one of terminal capability, subcarrier spacing, network indication, and protocol predefinition.

In some embodiments, the processor 510 is configured to:

in a case that the usage associated with the sounding reference signal resource or the sounding reference signal resource set includes antenna switching and a codebook, or in a case that the sounding reference signal resource or the sounding reference signal resource set can be used for antenna switching and codebook-based transmission at the same time, and the number of guard periods is 1 or 2, skip using the guard period.

In some embodiments, the processor 510 is configured to:

determine that a sending port of the sounding reference signal resource is consistent with a sending port of a PUSCH.

In some embodiments, in a case that resource types of the two target sounding reference signal resources are periodic or semi-persistent, the two target sounding reference signals satisfy at least one of the following:

the two target sounding reference signal resources are associated with a same target sounding reference signal resource set;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same; or the two target sounding reference signal resources are sent on a same slot.

In some embodiments, when the resource types of the two target sounding reference signal resources are aperiodic, the two target sounding reference signal resources satisfy at least one of the following:

the two target sounding reference signal resources are associated with different target sounding reference signal resource sets;

the usage configured in the two target sounding reference signal resources includes antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same;

aperiodic sounding reference signal resource triggers configured or associated in the two target sounding reference signal resources are the same;

aperiodic sounding reference signal resource trigger lists configured or associated in the two target sounding reference signal resources are the same;

the two target sounding reference signal resources are sent on a same slot;

slot offsets configured or associated in the two target sounding reference signal resources are the same; or valid slot offsets configured or associated in the two target sounding reference signal resources are the same.

In some embodiments, the processor 510 is configured to:

use a same closed-loop power control parameter value for sounding reference signal resources in the antenna switching group;

where the closed-loop power control parameter value is determined according to a sounding reference signal resource sent first in the antenna switching group.

In some embodiments, the processor 510 is configured to:

before a sounding reference signal resource transmitted first in the time domain, and after a sounding reference signal resource transmitted last in the time domain, skip determining the guard period.

In this embodiment of the present application, the terminal determines the target guard period of any two SRS resources adjacent in the time domain within an antenna switching group; and transmits two target sounding reference signals based on the target guard period, avoiding the defect that the guard period is relatively large when multiple SRS resources are in one SRS resource set when some antenna switching configurations are performed. At the same time, the terminal can determine the guard period between SRS resource sets, avoiding the defect that the resource between two adjacent SRS resource sets does not meet the minimum guard period requirement, increasing the flexibility of network configuration, and improving the antenna switching performance.

An embodiment of the present application further provides a readable storage medium. The readable storage medium stores a program or an instruction, and when the program or the instruction is executed by a processor, the various processes of the foregoing embodiment of the guard period determination method is performed and the same technical effects can be achieved. To avoid repetition, details are not described herein again.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing guard period determination method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A guard period determination method, comprising:

determining, by a terminal, a target guard period between two target sounding reference signal resources according to time domain positions of the two target sounding reference signal resources; and transmitting, by the terminal, two target sounding reference signals based on the target sounding reference signal resources and the target guard period, wherein the two target sounding reference signal resources are any two sounding reference signal resources that are adjacent in a time domain within one antenna switching group; and the one antenna switching group comprises all sounding reference signal resources used to detect one piece of complete channel state information, the all sounding reference signal resources in the one antenna switching group are of the same resource type, and the same resource type is one of aperiodic, semi-persistent, or periodic, wherein determining the target guard period of the two target sounding reference signal resources according to the time domain positions of the two target sounding reference signal resources comprises:

determining that a size of the target guard period is a first guard period size; and determining that a time domain position of the target guard period is located in a symbol adjacent to the two target sounding reference signal resources, wherein the first guard period size is determined based on at least one of terminal capability, subcarrier spacing, network configuration, protocol agreement, or a minimum guard period.

2. The guard period determination method according to claim 1, wherein determining the target guard period between the two target sounding reference signal resources comprises:

determining all symbols between the two target sounding reference signal resources as the target guard period, wherein a sounding reference signal resource set containing the two target sounding reference signal resources satisfies at least one of the following:

a guard period between multiple sounding reference signal resources used for antenna switching in one sounding reference signal resource set is greater than the minimum guard period;

a guard period between sounding reference signal resources used for antenna switching in multiple sounding reference signal resource sets is greater than the minimum guard period;

multiple sounding reference signal resource sets are sent in a same slot;

a guard period between multiple sounding reference signal resources used for antenna switching in one sounding reference signal resource set is less than a maximum guard period; or a guard period between sounding reference signal resources used for antenna switching in multiple sounding reference signal resource sets is less than a maximum guard period, wherein the maximum guard period comprises a maximum slot period or a maximum symbol period.

3. The guard period determination method according to claim 1, wherein determining the target guard period of the two target sounding reference signal resources based on the time domain positions of the two target sounding reference signal resources comprises:

when the number of target guard periods between the two target sounding reference signal resources is 1, determining that the target guard period is located after a first target sounding reference signal resource, wherein the first target sounding reference signal resource is a sounding reference signal resource located in the front among the two target sounding reference signal resources;

when the number of target guard periods between the two target sounding reference signal resources is 1, determining that the target guard period is located before a second target sounding reference signal resource, wherein the second target sounding reference signal resource is a sounding reference signal resource located in the rear among the two target sounding reference signal resources; or when the number of target guard periods between the two target sounding reference signal resources is 2, determining that the target guard period comprises a first target guard period and a second target guard period, wherein the first target guard period is located after the first target sounding reference signal resource, and the second target guard period is located before the second target sounding reference signal resource.

4. The guard period determination method according to claim 3, wherein determining the target guard period of the two target sounding reference signal resources based on the time domain positions of the two target sounding reference signal resources comprises:

determining that a third target guard period is before its corresponding target sounding reference signal resource; and determining that a fourth target guard period is behind its corresponding target sounding reference signal resource, wherein one target sounding reference signal resource corresponds to two target guard periods, and the two target guard periods comprise the third target guard period and the fourth target guard period.

5. The guard period determination method according to claim 1, wherein the two target sounding reference signal resources satisfy at least one of the following:

associated sounding reference signal resource set numbers are the same;

carrier numbers are the same;

subset bandwidth numbers are the same;

sounding reference signal resource numbers are different;

slot offsets are the same;

slot offsets are different;

period parameters among period and offset parameters are the same;

offset parameters among period and offset parameters are the same;

offset parameters among period and offset parameters are different;

symbol position indexes are different; or time domain position orders are different.

6. The guard period determination method according to claim 1, wherein transmitting, by the terminal, the two target sounding reference signals based on the target sounding reference signal resources and the target guard period comprises:

transmitting at least one of the following through a symbol that is not used as the target guard period and that is between the two target sounding reference signal resources:

physical uplink shared channel (PUSCH), physical random access channel (PRACH), or physical uplink control channel (PUCCH).

7. The guard period determination method according to claim 1, wherein transmitting the two target sounding reference signals based on the target sounding reference signal resources and the target guard period comprises:

when usage associated with the sounding reference signal resource or a sounding reference signal resource set comprises antenna switching and a codebook, or when the sounding reference signal resource or the sounding reference signal resource set is used for antenna switching and codebook-based transmission at the same time, and the number of guard periods is 1 or 2, skipping using the guard period.

8. The guard period determination method according to claim 7, wherein transmitting the two target sounding reference signals based on the target sounding reference signal resources and the target guard period comprises:

determining that a sending port of the sounding reference signal resource is consistent with a sending port of a PUSCH.

9. The guard period determination method according to claim 1, wherein when resource types of the two target sounding reference signal resources are periodic or semi-persistent, the two target sounding reference signal resources satisfy at least one of the following:

the two target sounding reference signal resources are associated with a same target sounding reference signal resource set;

usage configured in the two target sounding reference signal resources comprises antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same; or the two target sounding reference signal resources are sent on a same slot.

10. The guard period determination method according to claim 1, wherein when resource types of the two target sounding reference signal resources are aperiodic, the two target sounding reference signal resources satisfy at least one of the following:

the two target sounding reference signal resources are associated with different target sounding reference signal resource sets;

usage configured in the two target sounding reference signal resources comprises antenna switching;

path loss influence coefficients configured or associated in the two target sounding reference signal resources are the same;

network reception expected powers configured or associated in the two target sounding reference signal resources are the same;

path loss reference signals configured or associated in the two target sounding reference signal resources are the same;

sounding reference signal power control adjustment states configured or associated in the two target sounding reference signal resources are the same;

aperiodic sounding reference signal resource triggers configured or associated in the two target sounding reference signal resources are the same;

aperiodic sounding reference signal resource trigger lists configured or associated in the two target sounding reference signal resources are the same;

the two target sounding reference signal resources are sent on a same slot;

slot offsets configured or associated in the two target sounding reference signal resources are the same; or valid slot offsets configured or associated in the two target sounding reference signal resources are the same.

11. The guard period determination method according to claim 1, wherein determining the target guard period between two target sounding reference signal resources comprises:

using a same closed-loop power control parameter value for sounding reference signal resources in the antenna switching group, wherein the closed-loop power control parameter value is determined according to a sounding reference signal resource sent first in the antenna switching group.

12. The guard period determination method according to claim 1, wherein determining the target guard period between the two target sounding reference signal resources comprises:

before a sounding reference signal resource transmitted first in the time domain, and after a sounding reference signal resource transmitted last in the time domain, skipping determining the guard period.

13. The guard period determination method according to claim 1, wherein the one antenna switching group comprises sounding reference signal resources that are in different sounding reference signal resource sets and that are adjacent in the time domain, wherein the different sounding reference signal resource sets are on different slots.

14. A terminal, comprising a memory storing a computer program; and a processor coupled to the memory and configured to execute the computer program to perform operations comprising:

determining a target guard period between two target sounding reference signal resources according to time domain positions of the two target sounding reference signal resources; and transmitting two target sounding reference signals based on the target sounding reference signal resources and the target guard period, wherein the two target sounding reference signal resources are any two sounding reference signal resources that are adjacent in a time domain within one antenna switching group; and the one antenna switching group comprises all sounding reference signal resources used to detect one piece of complete channel state information, the all sounding reference signal resources in the one antenna switching group are of the same resource type, and the same resource type is one of aperiodic, semi-persistent, or periodic, wherein determining the target guard period of the two target sounding reference signal resources according to the time domain positions of the two target sounding reference signal resources comprises:

determining that a size of the target guard period is a first guard period size; and determining that a time domain position of the target guard period is located in a symbol adjacent to the two target sounding reference signal resources, wherein the first guard period size is determined based on at least one of terminal capability, subcarrier spacing, network configuration, protocol agreement, or a minimum guard period.

15. The terminal according to claim 14, wherein determining the target guard period between the two target sounding reference signal resources comprises:

determining all symbols between the two target sounding reference signal resources as the target guard period, wherein a sounding reference signal resource set containing the two target sounding reference signal resources satisfies at least one of the following:

a guard period between multiple sounding reference signal resources used for antenna switching in one sounding reference signal resource set is greater than the minimum guard period;

a guard period between sounding reference signal resources used for antenna switching in multiple sounding reference signal resource sets is greater than the minimum guard period;

multiple sounding reference signal resource sets are sent in a same slot;

a guard period between multiple sounding reference signal resources used for antenna switching in one sounding reference signal resource set is less than a maximum guard period; or a guard period between sounding reference signal resources used for antenna switching in multiple sounding reference signal resource sets is less than a maximum guard period, wherein the maximum guard period comprises a maximum slot period or a maximum symbol period.

16. The terminal according to claim 14, wherein the one antenna switching group comprises sounding reference signal resources that are in different sounding reference signal resource sets and that are adjacent in the time domain, wherein the different sounding reference signal resource sets are on different slots.

17. A non-transitory computer-readable storage medium, storing a computer program, when the computer program is executed by a processor, causes the processor to perform operations comprising:

determining a target guard period between two target sounding reference signal resources according to time domain positions of the two target sounding reference signal resources; and transmitting two target sounding reference signals based on the target sounding reference signal resources and the target guard period, wherein the two target sounding reference signal resources are any two sounding reference signal resources that are adjacent in a time domain within one antenna switching group; and the one antenna switching group comprises all sounding reference signal resources used to detect one piece of complete channel state information, the all sounding reference signal resources in the one antenna switching group are of the same resource type, and the same resource type is one of aperiodic, semi-persistent, or periodic, wherein determining the target guard period of the two target sounding reference signal resources according to the time domain positions of the two target sounding reference signal resources comprises:

determining that a size of the target guard period is a first guard period size; and determining that a time domain position of the target guard period is located in a symbol adjacent to the two target sounding reference signal resources, wherein the first guard period size is determined based on at least one of terminal capability, subcarrier spacing, network configuration, protocol agreement, or a minimum guard period.

* * * * *